(12) United States Patent
Bernardini

(10) Patent No.: US 6,328,464 B1
(45) Date of Patent: Dec. 11, 2001

(54) LUMINAIRE USING RIGHT ANGLE FILM

(75) Inventor: Allen J. Bernardini, Southbury, CT (US)

(73) Assignee: Litton Systems, Inc., Watertown, CT (US)

( * ) Notice: Subject to any disclaimer, the term of this patent is extended or adjusted under 35 U.S.C. 154(b) by 0 days.

(21) Appl. No.: 09/291,477

(22) Filed: Apr. 14, 1999

Related U.S. Application Data

(60) Provisional application No. 60/082,559, filed on Apr. 21, 1998.

(51) Int. Cl.[7] ................................. G02B 6/09; F21V 7/04
(52) U.S. Cl. .................... 362/558; 362/337; 362/551; 362/339; 362/329; 362/581; 385/36
(58) Field of Search .................... 362/551, 330, 362/329, 335, 337, 339, 558, 581; 385/33, 36, 901

(56) References Cited

U.S. PATENT DOCUMENTS

| | | | |
|---|---|---|---|
| 4,344,110 | * 8/1982 | Ruediger | ................................. 362/32 |
| 4,898,450 | 2/1990 | Jannson et al. | . |
| 5,315,491 | * 5/1994 | Spencer et al. | ........................ 362/84 |
| 5,475,785 | * 12/1995 | Johanson | .............................. 385/100 |
| 5,544,019 | * 8/1996 | Tatavoosian | ............................ 362/23 |
| 5,692,822 | * 12/1997 | Dreyer | .................................... 362/32 |
| 5,919,551 | * 6/1999 | Cobb, Jr. et al. | ..................... 362/337 |
| 6,155,703 | * 12/2000 | Rizkin et al. | ........................ 362/551 |
| 6,169,839 | * 1/2001 | Johanson | .............................. 385/146 |
| 6,222,971 | * 4/2001 | Veligdan et al. | ..................... 385/120 |

FOREIGN PATENT DOCUMENTS

| | | |
|---|---|---|
| 0 449 219 A1 | 10/1991 | (EP) . |
| 2 592 133 | 6/1987 | (FR) . |

* cited by examiner

*Primary Examiner*—Stephen Husar
(74) *Attorney, Agent, or Firm*—Lowe Hauptman Gilman & Berner, LLP

(57) ABSTRACT

Disclosed is a luminaire including a housing for receiving light axially and having at lest one optical surface for emitting light. A lens is mounted in the housing and has a light input portion and a light output portion. A prismatic film is mounted in the housing onto which light output from the output portion of the lens is incident thereon wherein light is reflected by the prismatic film radially outwardly therefrom.

15 Claims, 2 Drawing Sheets

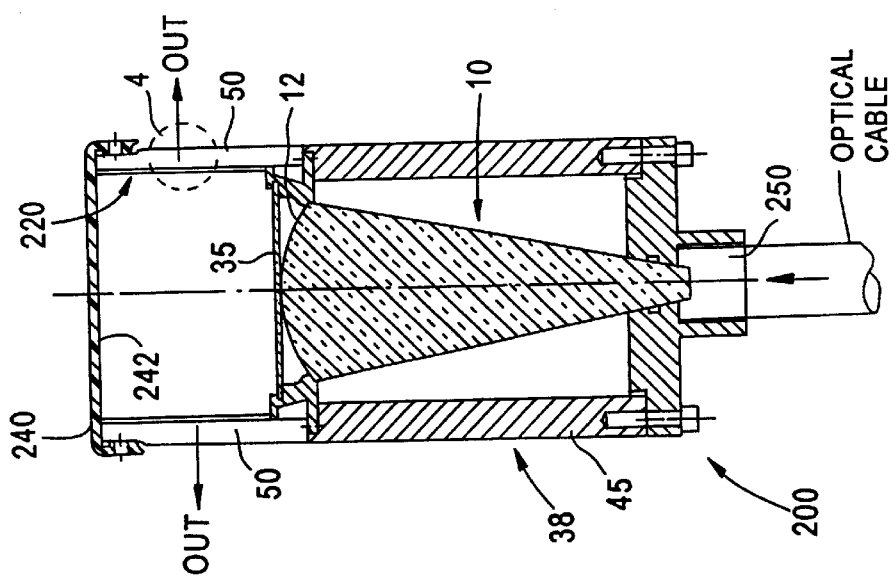
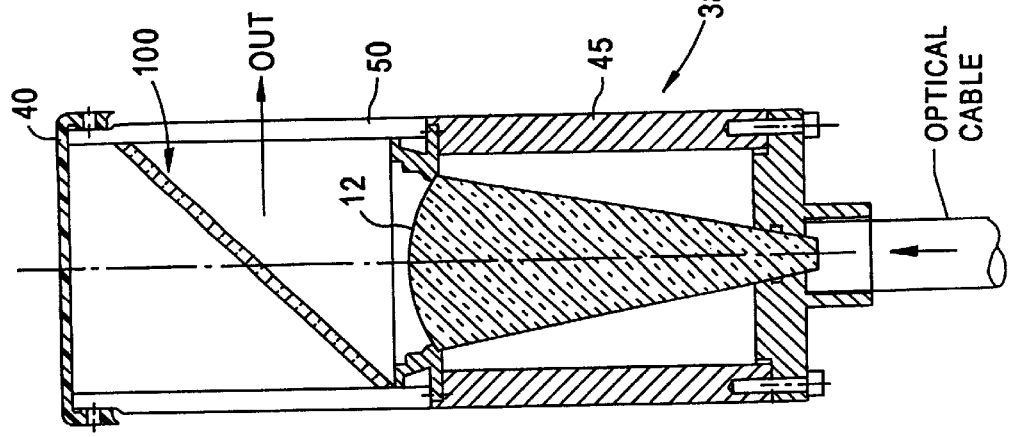
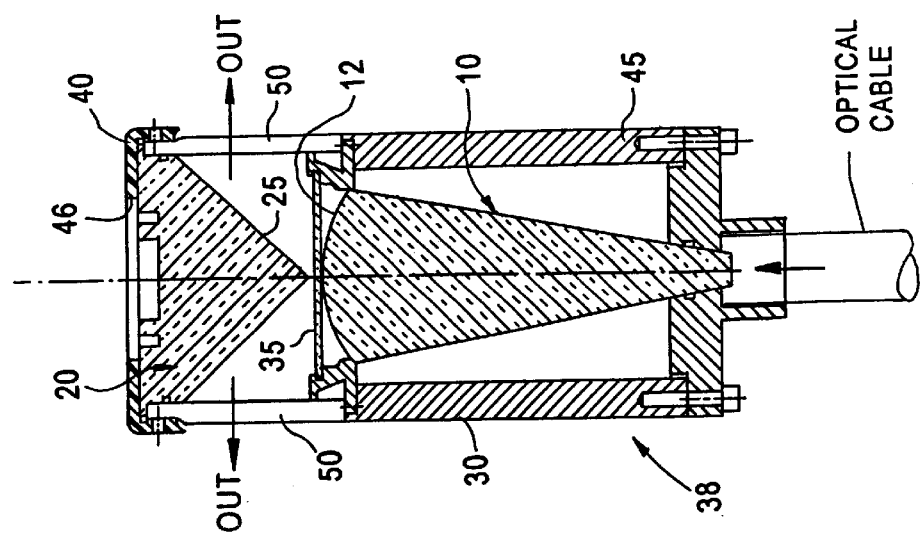

LUMINAIRE USING RIGHT ANGLE FILM

RELATED APPLICATION

The present application claims priority of U.S. Provisional Application Ser. No. 60/082,559 filed Apr. 21, 1998, entitled "NAVIGATION LIGHT FIXTURE USING RIGHT ANGLE FILM", the disclosure of which is incorporated by reference herein in its entirety.

FIELD OF THE INVENTION

The present invention relates generally to luminaires, and more particularly, to luminaires in which light is output radially outwardly in a complete circumferential 360° arc or a predetermined circumferential pattern.

BACKGROUND OF THE INVENTION

A luminaire is a light or lamp and is usually a floodlight fixture having a lamp or reflector. A luminaire can be used as a navigational light fixture, for signaling other ships of the direction of travel using green, red, white and other colored lights. FIG. 1 depicts a prior art luminaire. The luminaire includes lens 10 (or light transformer) having an upper curved surface 12 and an inverted cone 20 above the light transformer within an outer housing assembly 38.

The lens 10 is a light transformer. The lens 10 is an optically clear conical shaped device, usually made from lucite, glass, plexiglass or other like materials that takes a light beam from a light source and focuses or diffuses the beam. The light source entry is below the lens 10. The luminaire includes an outer housing assembly 38 including an upper housing 40 and a lower housing 45, each made of a composite material and/or metal. The lens 10 is mounted in the lower housing 45 and the cone 20 is mounted in the upper housing 40. A clear, hollow cylindrical support member 50 made of an optical acrylic joins the upper housing 40 and the lower housing 45. Upper housing 40 has an opening 46 therein which is substantially concentric to the cone 20. The opening 46 is optional and provides access to the cone 20 to adjust the orientation of the cone 20 when the cone 20 is masked to provide less than 360° light projection. Between the upper curved surface 12 of the light transformer and the inverted cone 20 is a diffuser 35. The diffuser 35 is a holographic diffuser and is either glass or plastic for shaping the beam. The cone 20 can be solid or hollow and has a highly polished reflective conically shaped exterior surface 25 facing the upper curved surface 12 of the lens 10. A color mechanism (not shown) can be provided in the light source.

The upper curved surface 12 of the cone 20 is spaced from the diffuser 35 by a gap. In some cases, either using mechanical baffles or not plating or polishing part of the cone, the light output can be limited to something less than 360° in the horizontal direction as depicted in FIG. 1. Light from the lens 10 shines on this conical surface 25 if there are no baffles or areas which are unplated on the cone 20, there will be a 360° light dispersion. The interior volume of the luminaire is sealed to prevent moisture from entering. The positioning of the cone 20 with regard to the lens 10 is somewhat critical in order to get maximization of the light output. The cone 20 is typically symmetrical with respect to the lens 10. Disadvantageously, the FIG. 1 luminaire requires a relatively expensive and heavy cone 20.

FIG. 2 is another prior art luminaire. The lower housing 45 is identical to FIG. 1 except that the optional light diffuser 35 is omitted. In luminaire in FIG. 2 is directional in that light is not output horizontally at 360°. There is a flat mirror 100 for reflecting light emitted from the flat mirror 100 only in the direction illustrated in FIG. 2. The flat mirror 100 extends from the lower housing 40 towards the upper housing 45. Although the mirror 100 can be rotated by a motor (not shown), light cannot be emitted continually in a 360° arc but can only be emitted in less than a 360° arc and then the mirror is rotated. Disadvantageously, the FIG. 2 luminaire can emit light in less than 360°. Although the FIG. 2 luminaire eliminates the cone 20, the FIG. 2 luminaire cannot emit light in 360°. A need exists in the art for a luminaire which does not require a cone and yet can disperse light in 360°.

SUMMARY OF THE INVENTION

It is, therefore, an object of the present invention to provide a luminaire which does not have a cone but can continually emit light in a 360° arc.

It is yet another object of the present invention to provide a luminaire which is inexpensive to manufacture, and reliable in operation.

It is yet another object of the present invention to provide a luminaire which uses a prismatic film for emitting light.

The present invention is directed to a luminaire in which light can be directed for a full 360° arc or can be selectively emitted for less than a 360° arc. Light is emitted from a lens and reflected off of a surface into a longitudinally extending prismatic film and light is directed outwardly from the luminaire at a direction transverse to the lens.

These and other objects of the present invention are achieved by a luminaire including a housing for receiving light axially and having at least one optical surface for emitting light. A lens is mounted in the housing and has a light input portion and a light output portion. A prismatic film is mounted in the housing onto which light output from the output portion of the lens is incident thereon wherein light is reflected by the prismatic film radially outwardly therefrom.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description thereof are to be regarded as illustrative in nature, and not as restrictive.

BRIEF DESCRIPTION OF THE DRAWINGS

The present invention is illustrated by way of example, and not by limitation, in the figures of the accompanying drawings, wherein elements having the same reference numeral designations represent like elements throughout and wherein:

FIG. 1 is an illustration of a prior art luminaire using a cone;

FIG. 2 is an illustration of a prior art luminaire using a mirror;

FIG. 3 is a luminaire using a prismatic film according to the present invention;

BEST MODE FOR CARRYING OUT THE INVENTION

Figure 5:
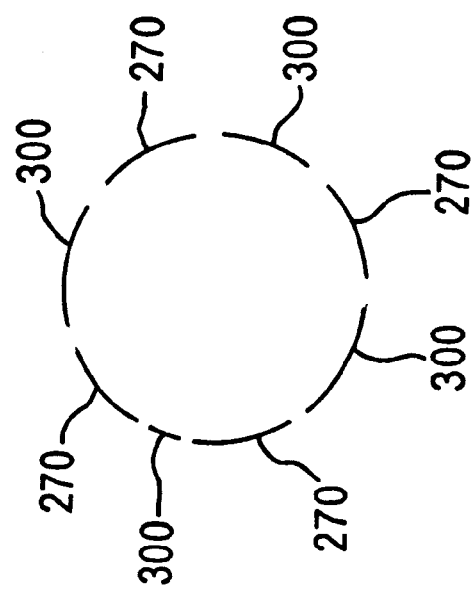
FIG. 5 is an illustration of reflective and non-reflective portions of the prismatic film.

FIG. 3 depicts a luminaire 200 according to the principles of the present invention. The description of identical reference numerals from FIGS. 1 and 2 is not repeated here for brevity and 200 series reference numbers are used to describe features which differ from the FIG. 1 embodiment. The primary difference between the FIG. 1 embodiment and the present invention depicted in FIG. 3 is that instead of the cone 20, a prismatic film is formed into a tube 220 for directing light radially outwardly in the horizontal direction depicted in FIG. 3. The preferred film is commercially available from the 3M Company, Minneapolis, Minnesota and is called Transmissive Right Angle Film (TRAF) II. The film is rolled edge-to-edge into the cylinder 220 and inserted into the inner wall of the optical acrylic cylindrical support 50. The cylinder 220 is self-supporting and is approximately preferably 0.006 of an inch thick. The upper housing 240 is preferably plastic and the inner surface 242 of the upper housing 240 can either be reflective or non-reflective. Although FIGS. 1–3 depict the luminaires in an upright orientation, each of the luminaires can be used in any orientation. Accordingly, terms such as "above", "below" and "horizontal" are used for convenience when referring to the drawings and should be construed in the relative sense.

Figure 4:
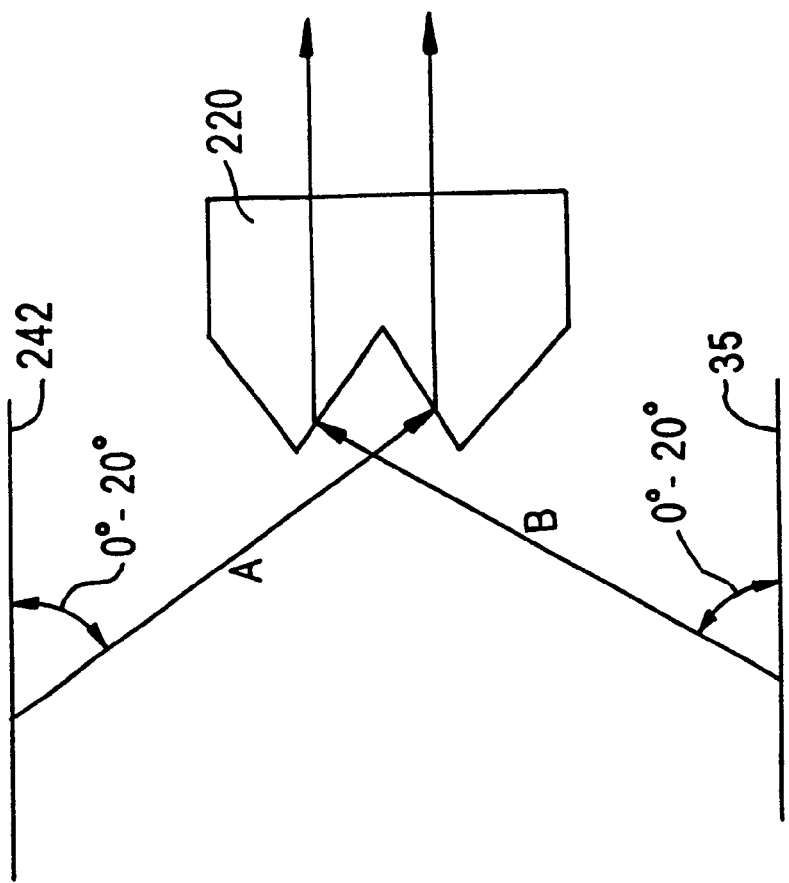
FIG. 4 is an illustration of light being reflected by the prismatic film in greater detail as illustrated by the dashed lines in a circle in FIG. 3.

Light emitted from the lens 10 is either reflected off inner surface 242 or is directly incident upon the inner wall of the cylinder 220. As depicted in FIG. 4, cylinder 220 has light ray A incident thereon as reflected from the inner surface 242 at an angle between 0°–20° and film 200 has light ray B incident thereon as emitted from either diffuser 35 or curved surface 12 at an angle between 0°–20°. The incident light rays A and B are then emitted from the prismatic film in the horizontal direction depicted in FIG. 4.

The upper housing 240 has to be sealed to the acrylic cylindrical support 50 to prevent moisture from entering the luminaire 100. Composite material is preferred as opposed to metal for radar cross-section. The rest of the housing 40 and 45 is also a composite material, but could also be metal. The lens 10 receives the light via an optical connector that terminates to the luminaire 100 at a recess 250 in the lower housing 45. The optical connector is attached to an optical cable that runs down to a light source called an illuminator or ballast. The optical cable can be a fiber optic, glass or plastic fiber bundle, or a solid large core fiber could be a solid plastic or could also be glass. Color filters can be provide in the illuminator as well.

The film is similar to a fresnal lens. The film could alternatively be a solid molded device in the form of a fresnal lens. The film can either encircle the cylinder and be 360° or it can be some segment of 360° to control the output of the light. For example, non-reflective material 300 could be segmented with segments of film 300 as depicted in FIG. 5 or tape or a mask 300 could be placed over the area of the cylinder 200 in which it is desired not to output light.

Advantageously, the present invention provides a light weight, economical luminaire which uses a prismatic film for directing light outwardly in the horizontal direction in an arc of up to 360°.

It will be readily seen by one of ordinary skill in the art that the present invention fulfills all of the objects set forth above. After reading the foregoing specification, one of ordinary skill will be able to affect various changes, substitutions of equivalents and various other aspects of the invention as broadly disclosed herein. It is therefore intended that the protection granted hereon be limited only by the definition contained in the appended claims and equivalents thereof.

What is claimed is:

1. A luminaire comprising:

a housing for receiving light axially and having at least one optical surface for emitting light;

a lens mounted in said housing and having a light input portion and a light output portion;

a prismatic film mounted in said housing onto which light output from said output portion of said lens is incident thereon; and a plurality of circumferentially arranged supports positioned radially outwardly from said prismatic film wherein said reflected light is output in one or more arcs;

wherein light is reflected by said prismatic film radially outwardly therefrom; and wherein a light source provides light to said lens in an axial direction and light is output from said luminaire in a transverse direction.

2. The luminaire of claim 1, wherein said reflected light is output 360° from said luminaire.

3. The luminaire of claim 1, further comprising a diffuser mounted between said lens and said prismatic film.

4. The luminaire of claim 1, wherein said lens is a light transformer that spreads light.

5. The luminaire of claim 1, wherein said housing includes an upper body and a lower body.

6. The luminaire of claim 5, wherein said lens is located in said lower body.

7. A luminaire comprising:

a housing for receiving light axially and having at least one optical surface for emitting light, said housing including an upper body and a lower body;

a lens mounted in said housing and having a light input portion and a light output portion;

a prismatic film mounted in said housing onto which light output from said output portion of said lens is incident thereon;

a hollow cylindrical optically transparent support member mounted between said upper body and said lower body;

wherein light is reflected by said prismatic film radially outwardly therefrom.

8. The luminaire of claim 7, wherein said luminaire is sealed.

9. The luminaire of claim 7, wherein said prismatic material forms a cylindrical tube mounted radially inside said optically transparent support member.

10. The luminaire of claim 7, further comprising at least one non-optically transmissive portion located adjacent to a segment of said prismatic film.

11. The luminaire of claim 7, wherein an inner surface of said upper body is one of non-reflective and reflective.

12. The luminaire of claim 7, further comprising a masking on a portion of said prismatic film to prevent light from being emitted 360°.

13. A luminaire for use as navigational lighting on ships, the luminaire comprising:
   a housing;
   a lens mounted in said housing and having a light input portion and a light output portion;
   a light source for providing light to said lens through said light input portion in an axial direction;
   a plurality of circumferentially arranged supports positioned radially outwardly from said prismatic film wherein said reflected light is output in one or more arcs; and
   a prismatic film mounted in said housing for transmitting light from said light output portion outwardly in a transverse direction.

14. The luminaire of claim 1, wherein a majority of light is reflected by said prismatic film radially outwardly therefrom.

15. The luminaire of claim 13, wherein said prismatic film transmits a majority of light from said light output portion outwardly in a transverse direction.

* * * * *